US010521185B1

(12) United States Patent
Kim et al.

(10) Patent No.: US 10,521,185 B1
(45) Date of Patent: Dec. 31, 2019

(54) PRIVACY-ENABLED VOICE-ASSISTED INTELLIGENT AUTOMATED ASSISTANT USER INTERFACE DEVICE

(71) Applicant: Blackberry Limited, Waterloo (CA)

(72) Inventors: Younghwan Kim, Waterloo (CA); Scott David Reeve, Waterloo (CA); Patrick David John Murtha, Waterloo (CA); Thomas P. Dye, Waterloo (CA); Gene Santana, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/279,701

(22) Filed: Feb. 19, 2019

(51) Int. Cl.
G06F 3/16 (2006.01)
H04R 3/00 (2006.01)

(52) U.S. Cl.
CPC .............. *G06F 3/165* (2013.01); *H04R 3/00* (2013.01)

(58) Field of Classification Search
CPC .................................. H04R 3/00; G06F 3/165
USPC ........................................................ 381/123
See application file for complete search history.

(56) References Cited

PUBLICATIONS

Anonymous, "IoT Control Device with Simplified Interface". An Ip.com Prior Art Database Technical Disclosure, IP.com No. IPCOM000255196D, Sep. 10, 2018, 23 pages. (Year: 2018).*
Anonymous, "IoT Control Device with Simplified Interface". An Ip.com Prior Art Database Technical Disclosure, IP.com No. IPCOM000255196D, published Sep. 10, 2018, 23 pgs.

* cited by examiner

*Primary Examiner* — Paul Kim
(74) *Attorney, Agent, or Firm* — Jenna L. Wilson; Wilson Lue LLP

(57) ABSTRACT

A user interface device for an intelligent automated assistant service uses a plurality of audio data paths that can be selectively switched to operate in a privacy mode. There is provided a first audio data input path between the audio input subsystem and an internal buffer; a first audio data output path between the internal buffer and the first communications subsystem; a second audio data output path between the internal buffer and the second communications subsystem; and a first audio data bypass path between the audio input subsystem and the second communications subsystem. In a first state, the first audio data input path directs audio data to the internal buffer, and to the first and second audio data output paths. In a second state, the first audio data input path is terminated and audio data is directed to the second communications subsystem on the first audio data bypass path.

19 Claims, 5 Drawing Sheets

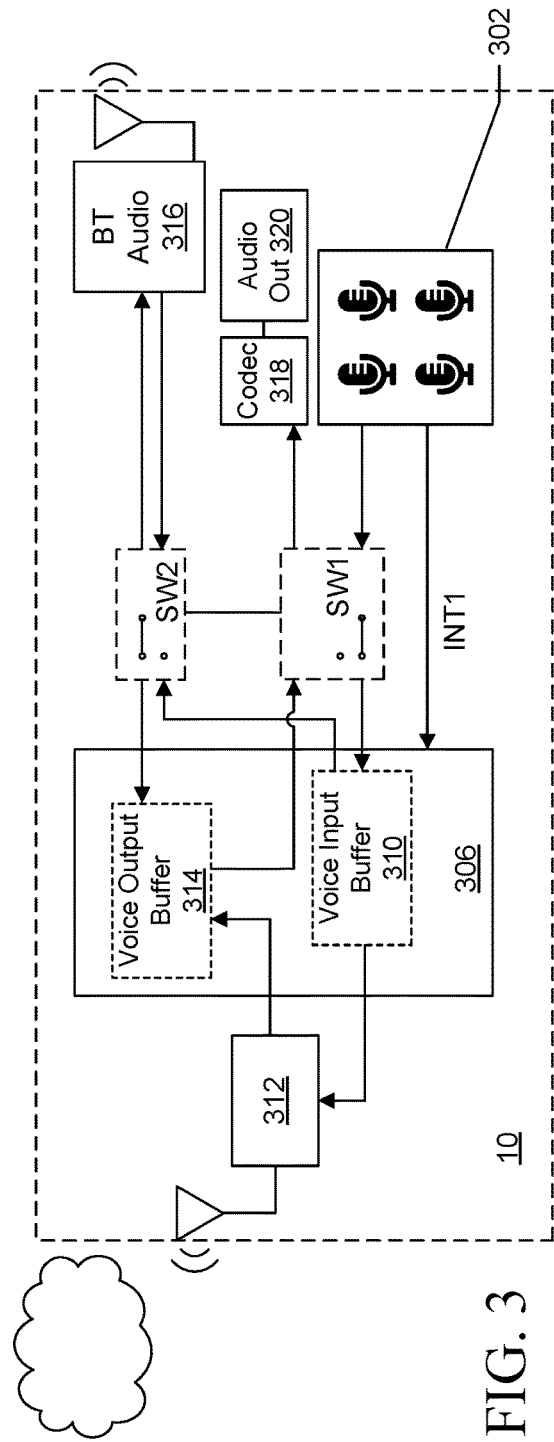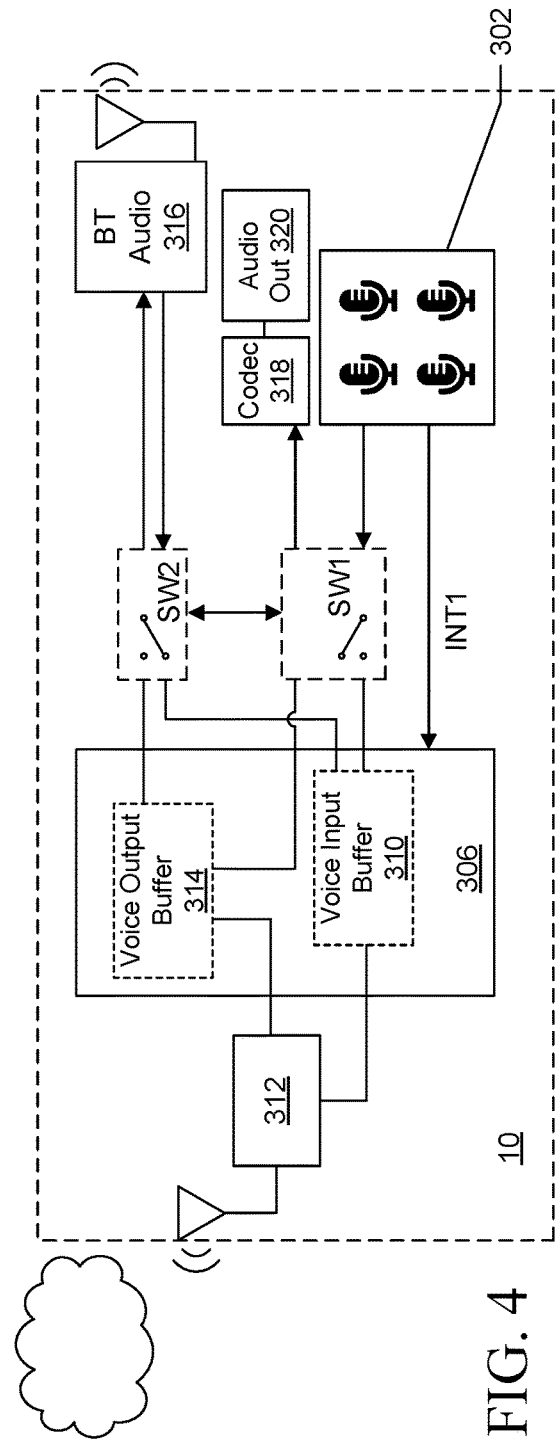

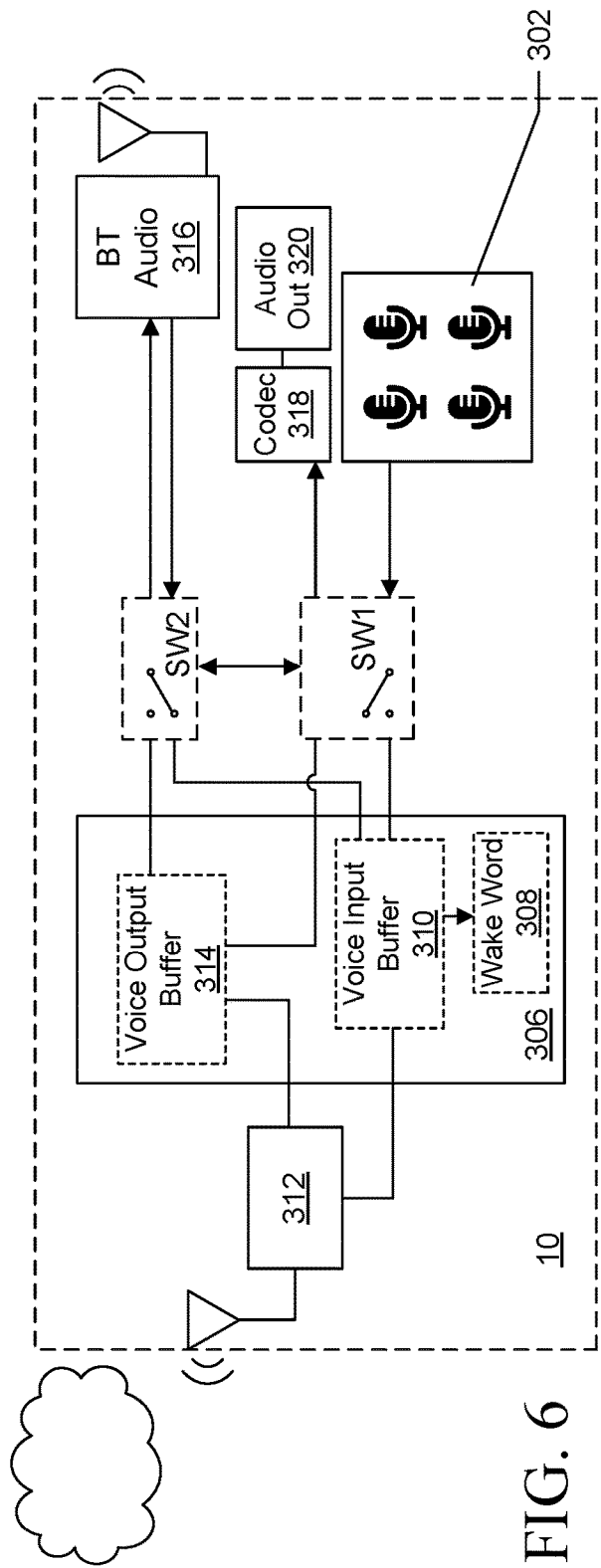
FIG. 6
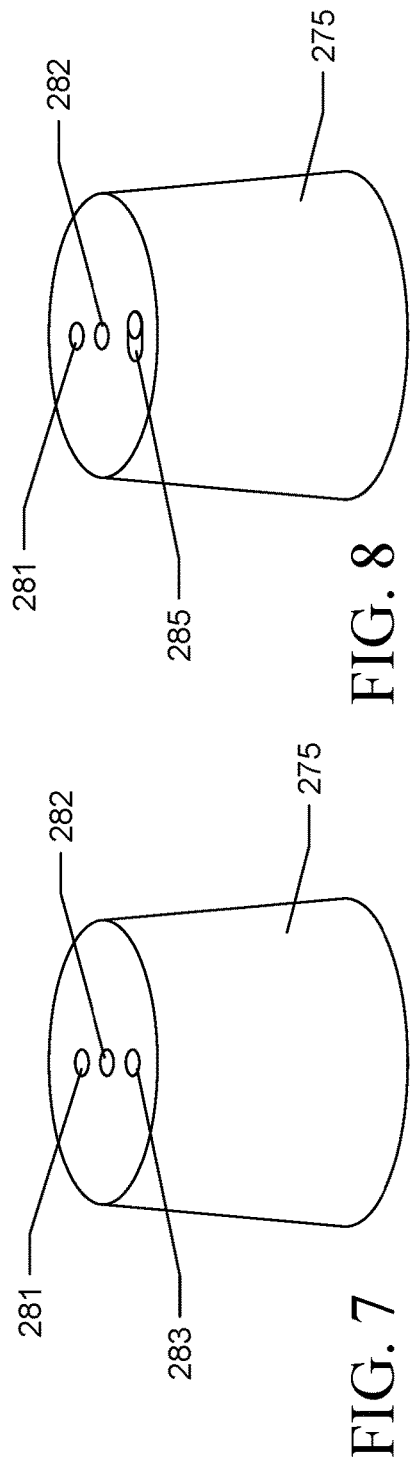
FIG. 7
FIG. 8

PRIVACY-ENABLED VOICE-ASSISTED INTELLIGENT AUTOMATED ASSISTANT USER INTERFACE DEVICE

TECHNICAL FIELD

The present disclosure relates to intelligent automated assistants, and specifically to a privacy-enhancing system implemented in an intelligent automated assistant user interface device.

TECHNICAL BACKGROUND

Many users find that voice-assisted intelligent automated assistants provide a convenient, hands-free interface with many services and smart devices. A popular form of intelligent automated assistant is marketed to users in the form of a so-called "smart speaker", which packages microphones, speakers, and limited processing capabilities in a device that is seemingly capable of receiving voice input, processing the input to understand the user's intent, and providing either an audible response or a responsive action. However, most such smart speakers in fact record the voice input and transmit it over a public network to a remote intelligent automated assistant service, where speech recognition and natural language processing take place. Consequently, user's speech may be recorded and stored by the smart speaker or stored by a remote service beyond the user's direct control. The risk of a consequential privacy breach is of concern to some users, and a mechanism for controlling the unwanted recording of user's speech is needed.

BRIEF DESCRIPTION OF THE DRAWINGS

FIG. 3 is a schematic illustrating a possible configuration of a user interface device such as that illustrated in FIG. 2.

FIG. 4 is a schematic of the user interface device of FIG. 3 in a second configuration.

FIG. 6 is a further schematic illustrating an alternate configuration of the user interface device of FIG. 2.

FIGS. 7 and 8 are perspective views illustrating placement of user input interface components on a user interface device such as a smart speaker.

DETAILED DESCRIPTION OF EXAMPLE EMBODIMENTS

Figure 1:
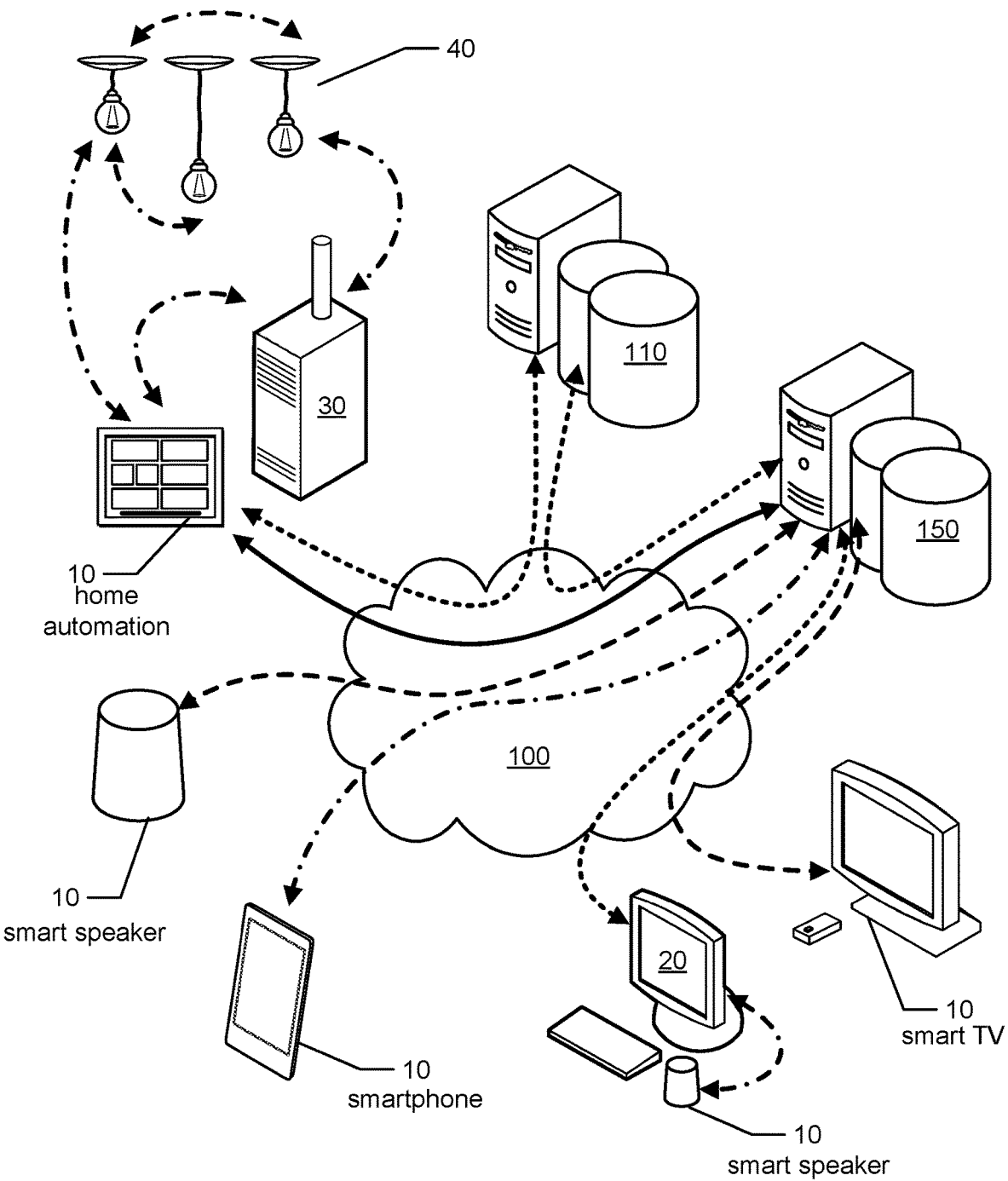
FIG. 1 is a schematic illustrating a possible network topology including a variety of smart devices and supporting systems communicating a network, such as a wide area network.

Voice-assisted intelligent automated assistants provide a convenient interface between users and a variety of services and smart devices, ranging from entertainment services and personal information management to thermostats and toys. Briefly, a voice-assisted intelligent automated assistant service receives speech input from a user and processes the input to determine the user's intent, and execute tasks in compliance with the determined intent, either directly or by transmitting instructions or data to other services or devices. For example, a voice-assisted intelligent automated assistant service executing on a user's smartphone may receive a spoken command from the user—"call Alice"—identify an intent to place a voice call to a person listed in the user's address book, and automatically initiate a voice call to that person. A voice-assisted intelligent automated assistant service operating in a home automation network may receive a spoken command from the user to configure a room for movie viewing, identify an intent to decrease room lighting to a specified level and to close the window blinds, and automatically transmit instructions to respective controllers to accomplish those tasks. The assistant may also handle personal data management or queries—for example, a user may instruct the assistant, "remind me to mail that letter tomorrow" or ask, "what is the current temperature?". The assistant, in the first case, may identify the user's intent to set a reminder in a calendar data store, and will create and save the event. In the second case, the assistant will infer that the user seeks an informational answer and provide an audible answer with the requested information.

Many voice-assisted intelligent automated assistant services rely on speech recognition and natural language processing in order to successfully discern the user's intent and to identify appropriate workflows and tasks that are likely to fulfil the user's intent. For example, for a service to answer the question "what is the current temperature?", the service must accurately convert the user's speech to text and perform natural language processing on the text to determine that the user's request is directed to a weather report. The service must then determine that contextual information—the user's current geographic location—must be collected, then a suitable query must be constructed and transmitted to an appropriate information service. The response from the information service, likely received in a text format, must be converted from text to speech and delivered to the user. Artificial intelligence may be employed to enhance any part of the intelligent automated assistant service, such as speech recognition, language process, or workflow development.

With the proliferation of smart devices in the home and workplace adapted for control using voice-assisted technology and user requirements for near-instantaneous response by intelligent automated assistants to a spoken command, those skilled in the art appreciate that it is practical and cost-effective for the resource-intensive processes of speech recognition and language processing to be hosted remotely from the user. Thus voice-assisted intelligent automated assistants are commonly implemented for most users in a platform as a service (PaaS) or software as a service (SaaS) model. Organizations capable of operating and maintaining their own infrastructure may implement an assistant in a self-hosted model. Examples of currently commercialized intelligent automated assistant services include Amazon Alexa® from Amazon.com, Inc.; Google Assistant™ from Google LLC; and Cortana® from Microsoft Corporation. These platforms are offered as cloud-based services to users, who may access the service using any compatible user interface device.

An increasingly common user interface device for accessing these services is the so-called "smart speaker", which in its most common household form is a portable or mountable electronic device including a built-in speaker, microphone array, and network communication subsystem that is configured to receive speech input and interface with an intelligent automated assistant system to provide assistant services. While a form of virtual assistant or software agent may execute on the device itself, as discussed above smart speaker solutions often rely on a cloud-based service, thereby reducing the power consumption and processing requirements of the smart speaker. While conventional smart speakers are not intended to be mobile devices—typically, they are tabletop devices or wall or ceiling-mounted devices—they may be considered "portable" in the sense that they are easily repositionable with little effort on the part of the user.

FIG. 1 illustrates an example topology including user interface devices 10. In this example, the various user interface devices 10 communicate over a network with a central intelligent automated assistant service provided by system 150. The term "central" is used to denote a single system 150 that may serve a variety of devices in households, workplaces, domains, and organizations over a wide area network 100, typically the Internet; the system 150 may be implemented using a cloud-type architecture in which computing and storage resources are distributed over the same network 100 or across another network, not shown. As described above, central system 150 may provide speech recognition and language processing on data received from each of the user interface devices 10. The system 150 may provide other data processing services as mentioned above to enable the identification and execution of workflows to fulfill tasks on behalf of the users of the user interface devices 10.

The user interface devices 10 in the network can include smart speakers, smartphones and other wireless communication devices, home automation control systems, smart televisions and other entertainment devices, and the like. User interface devices 10 may be provided in any suitable environment; for example, while not shown in FIG. 1, a user interface device may be provided in a motor vehicle. The user interface devices 10 may operate in a standalone manner, not part of a local area network or mesh network; or they may operate in a local network. For example, FIG. 1 illustrates a smart speaker wirelessly paired (e.g., using the Bluetooth® protocol) with a personal computer 20. Alternatively, the personal computer 20 may be used to control the smart speaker. A smart speaker may also be paired with or controlled by a mobile wireless communication device, as discussed below. A user interface device 10 that operates as a home automation control system may be joined in a mesh network with one or more smart appliances, such as light fixtures 30, or a heating or cooling system 40. Each of these user interface devices 10 may provide a voice interface for a local user to interact with the intelligent automated assistant service provided by the system 150 as described above.

Some user interface devices 10 may be configured to communicate with other services over the network 100, such as a home automation or security service 110. The central intelligent automated assistant system 150 may be configured to communicate with the additional service 110 to execute tasks as required for a user; for instance, a mobile user who is away from home may instruct the intelligent automated assistant service via her smartphone, which operates as a user interface device 10 for the intelligent automated assistant service, to verify that the front door of her home is locked; the speech input is transmitted from the smartphone to the service 150, which recognizes and processes the speech input to define an instruction for the security service 110, and transmits an instruction to the security service 110. The security service 110 then transmits its own instruction to the smart lock on the user's door. Configuration of these devices and systems to accomplish such tasks, for example through the use of application programming interfaces and appropriate authentication protocols, will be known to those skilled in the art. Further, a user interface device 10 may be configured to communicate with a plurality of intelligent automated assistant systems, and not merely the single system 150 illustrated in FIG. 1.

Figure 2:
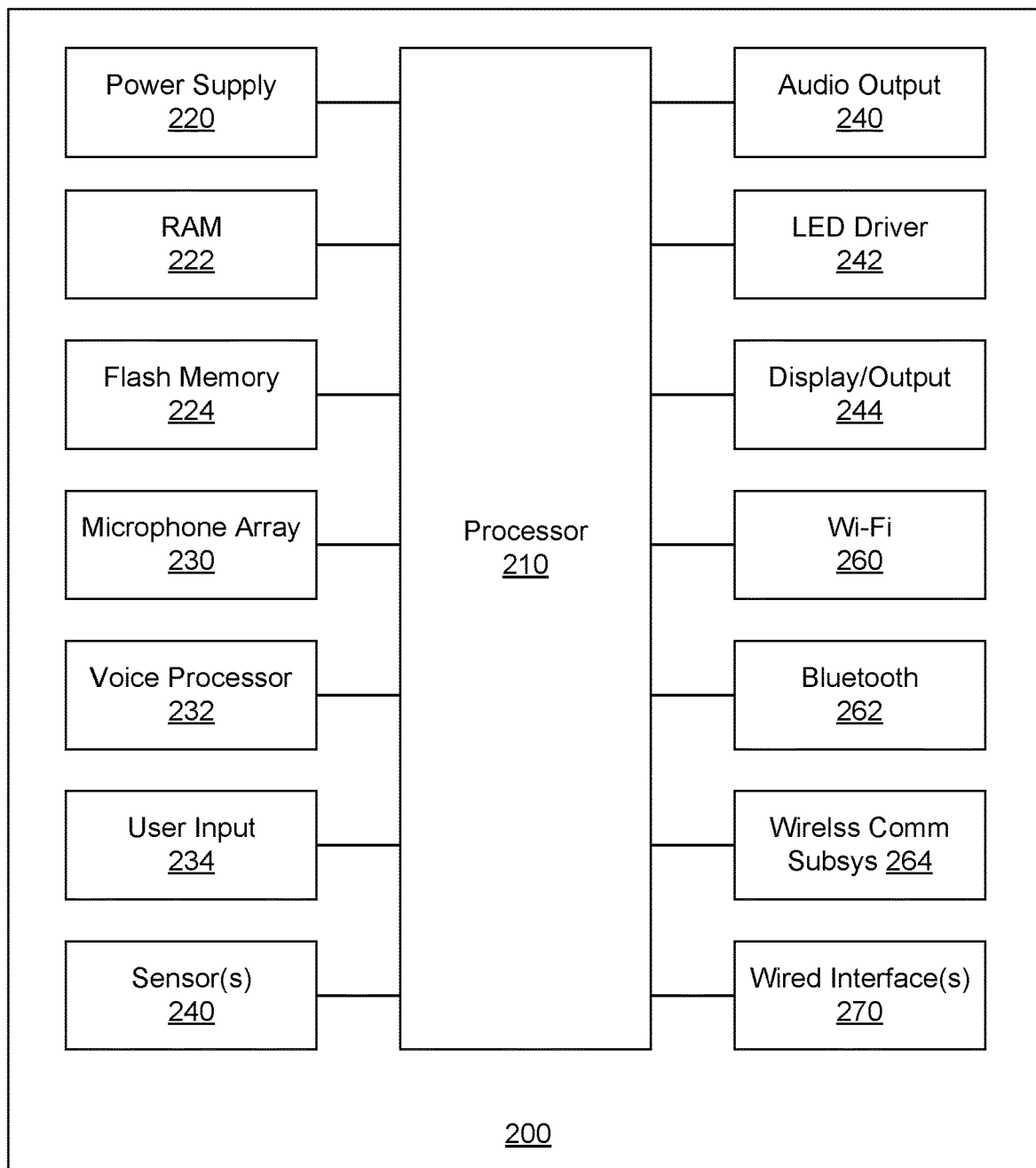
FIG. 2 is a block diagram illustrating select components of a user interface device such as a smart speaker.

FIG. 2 illustrates select components of a smart speaker 200. The device includes a microprocessor 210 for executing the device operating system and locally stored programming. Volatile memory, such as random access memory 222, and non-volatile memory, such as flash memory 224, store code and data, including recorded audio data. Audio data obtained by the smart speaker 220 may be stored permanently or temporarily in memory in the smart speaker 200, whether it is transmitted to a remote system for recognition and processing or not. For example, audio data may be stored in an internal buffer in memory prior to sending to a communications subsystem of the speaker 200. The memory 222 and/or 224 and the microprocessor 210 may be provided in an integrated system on chip (SoC), separately from or together with at least some of the communication subsystems described below.

The microphone array may comprise one or more microphones, preferably a plurality of microphones, and may be comprised in a SoC including far-field voice processing and other digital signal processing components 232. In some embodiments, as referenced below, the SoC may include circuitry or programming to enable detection of a "wake word", i.e., a trigger word or sound that is used to trigger audio recording and transmission of audio from the smart speaker 200 to a remote system such as the system 150. In other embodiments, wake word detection functionality may be implemented by the microprocessor 210.

In addition to the microphone array 230, other user input mechanisms 234 may be provided, including, but not limited to, push buttons, sliders, rocker switches, dials, and touch interfaces such as capacitive buttons or touchscreens. These user input mechanisms 234 can be operated to power the smart speaker 200 on and off; to mute the microphone array 230; to adjust the volume of the output audio from the smart speaker 200; and, as discussed below, to enter a privacy mode. The smart speaker 200 may receive other input through sensors 240, including, but not limited to, cameras, ambient light sensors, gyroscopes, temperature sensors, and humidity sensors. This other input may be used to provide context to user commands when input speech is processed by the smart speaker 200 or the remote system 150.

User feedback can be provided by the smart speaker 200 using an audio output subsystem 240. This can include a speaker assembly and one or more lines out for connecting an external speaker device, headphones, and the like. Alternatively or additionally, visual and/or haptic, or other sensory feedback can be provided by appropriate output means 244. For instance, an LED driver 242 and an LED array or display may be provided to indicate when the smart speaker 200 is in a powered on state, a mute mode, or a privacy mode as discussed below.

The smart speaker 200 can be provided with one or more wired or wireless communications subsystems 260, 262, 264, 270. In some implementations, the smart speaker 200 may be provided with a cellular transceiver for communicating with one or more radio access networks, using one or more wireless data communication protocols and standards. For use in a home or office environment, however, a cellular transceiver may not be used, since the local network may be a wireless local area network (WLAN). Thus, a WLAN transceiver may be provided for communicating with the WLAN via a suitable access point, in accordance with IEEE 802.11x standards (sometimes referred to as W-Fi®). Other communication protocols may be used for the WLAN. The wireless transceivers may also comprise a short-range wireless transceiver, such as a Bluetooth® transceiver 262, for communicating with a nearby device. The Bluetooth transceiver 262 may be compatible with any suitable version of the Bluetooth protocol including Bluetooth low energy (Bluetooth Smart). Other short-range wireless communication technologies may be provided instead of, or in addition to, Bluetooth including but not limited to Near Field Communication (NFC), IEEE 802.15.3a (also referred to as UltraWideband (UWB)), Z-Wave, ZigBee, ANT/ANT+ or infrared (e.g., Infrared Data Association (IrDA) communication).

The mobile transceiver 200 may alternatively communicate with a LAN or other device using a wired port 270, such as an Ethernet port. Several ports may be provided, including USB-compliant ports for communication with other user devices, or for debugging or programming purposes.

The smart speaker 200 includes a power supply, which may include energy storage (e.g., a removeable or non-removable battery). The components illustrated in FIG. 2 may be packaged in a cooperating cover and a base, or any suitable containing structure.

It will be understood by those skilled in the art that FIG. 2 and the foregoing description describes only select components of a smart speaker 200 for ease of exposition. Many components that would be known to and understood by those skilled in the art, such as controllers, rectifiers, converters, amplifiers, codecs, and the like are not shown in the interest of simplicity.

As smart speakers 200 and similar user interface devices 10 for use with intelligent automated assistant services have become more widespread, so too have privacy concerns. Some users are concerned that smart speakers or the intelligent automated assistant service will record private conversations without their knowledge, or that they will be unable to control the dissemination of their recorded speech once it is in the possession or control of the software agent platform. Use of the service and access to user data may be defined by privacy policies and agreements between the service operator and its users; however, such provisions only provide guidelines for behavior and do not necessarily align with actual use and operation. A malicious third party may gain unauthorized access to stored audio files or monitor data transmissions between the smart speaker and a remote intelligent automated assistant service. Privacy breaches may be caused inadvertently by the intelligent automated assistant service operator while managing stored user data. Thus, an intelligent automated assistant service or system of this nature may be considered "untrusted", in that the user of the user interface device employed to access the intelligent automated assistant service does not have physical or programmatic control over the operation of the service or system, and does not have physical or programmatic control over any of their data stored on the system.

To mitigate some of this concern—and to reduce the consumption of resources by the intelligent automated assistant service—a user interface device 10 (including a smart speaker 200) may be configured to only store or transmit audio input received by the device 10 only when triggered by a wake word, as detected by the user interface device 10. Thus, until the wake word is detected, any audio input received by the microphone(s) of the user interface device 10 is effectively ignored by the intelligent automated assistant service. When the wake word is detected, the user interface device 10 begins to (optionally) store received audio input following the wake word and to transmit the audio input to the intelligent automated assistant service for speech recognition. The user interface device 10 may be configured to cease this storage and transmission operation after a predefined period of time, for example, after a predefined number of seconds of silence or audio input not comprising speech is detected. However, this is not an ideal solution, as the user may unwittingly speak the wake word—or the onboard wake word detection may interpret another sound as the wake word—thus triggering the recording of audio and transmission of the recorded audio to the platform when the user does not expect it.

While a significant part of this risk can be avoided by limiting smart speaker communications to a local network, this is not a convenient solution: after detection of the wake word, common smart speakers rely on the remote system, such as the system 150, to recognize speech in the recorded audio and execute various tasks in response to the commands detected in the speech. Without the remote system 150, the smart speaker may have extremely limited virtual assistant capabilities—if any.

Therefore, to further address privacy concerns, smart speakers typically include a "mute" function, which disables the microphone array. When the mute feature is enabled, the smart speaker can neither detect a wake word nor record audio for transmission to the software agent platform. Thus, the user's conversations are not recorded, and the voice-assistive technology is not available.

However, disabling the microphone array with the mute function prevents the smart speaker from being used for other communications that do require an active microphone array, but do not require the intelligent automated assistant service. For example, smart speakers within a home or workplace environment may be connected in a home area network and may be configured to operate as an intercom system: audio input received at one smart speaker can be transmitted to other smart speakers on the same network. Because this function does not require speech recognition or other resource-intensive functionality, it can be handled by the microprocessor 210 and other local components without requiring audio data to be sent to the intelligent automated assistant service. As another example, a smart speaker may be paired (e.g., via a Bluetooth connection) to a mobile phone. The user may use the smart speaker as a hands-free speakerphone interface for the mobile phone during a voice or video call placed using the mobile phone, whether an intelligent automated assistant service is invoked to assist in placing the call or not.

Accordingly, the embodiments described here provide a user interface device 10, such as a smart speaker 200, that can be configured to implement a privacy mode in which speaker and microphone functions are available but audio data is not made available to a remote intelligent automated assistant service such as the system 150, thereby avoiding undesired recording and storage of audio data by either the user interface device 10 or the remote service. The privacy mode can be implemented by either a hardware or software enabled switch element. In one embodiment, a user interface device such as a smart speaker is provided, comprising an audio input subsystem, a first and a second communications subsystem, at least one processor in operative communication with the audio input subsystem and the first and second communications subsystems, a first audio data input path between the audio input subsystem and an internal buffer, a first audio data output path between the internal buffer and the first communications subsystem, a second audio data output path between the internal buffer and the second communications subsystem, a first audio data bypass path between the audio input subsystem and the second communications subsystem, and a switch element, when in a first state, directing audio data provided by the audio input subsystem on the first audio data input path to the internal buffer, and to both the first communications subsystem and the second communications subsystem on the first audio data output path and the second audio data output path, respectively; the switch element, when in a second state, terminating the first audio data input path and directing the audio data provided by the audio input subsystem to the second communications subsystem on the first audio data bypass path. In another embodiment, a method is provided for implementation at a user interface device such as a smart speaker comprising an audio input subsystem, at least a first and second communications subsystem, and a user input interface, the method comprising obtaining audio data from audio input received at the audio input subsystem; directing the audio data simultaneously to the first communications subsystem for transmission to a first external system and to the second communications subsystem for transmission to a second external system; receiving a first user input at the user input interface; and in response to receipt of the first user input, terminating direction of the audio data to the first communications subsystem and directing the audio data only to the second communications subsystem.

Turning to FIG. 3, a first schematic illustrates select components of a user interface device 10. An audio input subsystem 302 comprises the aforementioned microphone array, and optionally audio data processing components in a SoC, such as a far-field processor and other processing components. As mentioned above, the SoC may include wake word detection functionality, which is configured only to detect a single command that is interpreted as a wake word. In such an embodiment, on detection of the wake word, the audio input subsystem 302 transmits a trigger signal or interrupt to the microprocessor 306, to signal the microprocessor 306 to initiate any required buffering or storage of the received audio data, and transmission of the audio data to a communications subsystem 312 for ultimate transmission to the intelligent automated assistant service, not shown in FIG. 3.

In normal operation, audio data generated from audio input received by the audio input subsystem 302 is provided to an internal buffer. In the embodiment illustrated in FIGS. 3 and 4, the internal buffer is comprised in memory in the microprocessor 306, although it will be understood by those skilled in the art that the memory need not be integrated in the microprocessor. The internal buffer here is shown as a separate voice input buffer 310 and a voice output buffer 314. The audio data received from the audio input subsystem 302 is received in the voice input buffer 310.

From the input buffer 310, the audio data is then transmitted to a first communications subsystem 312 for transmission to the remote intelligent automated assistant service. In this example, the first communications subsystem 312 may be a W-Fi transceiver, which transmits the audio data to a suitable access point to a network. If a response is sent by the intelligent automated assistant service to the user interface device 10, the response may be received by the same first communications subsystem 312 and provided to the microprocessor 306 for processing.

If another communications subsystem requires the audio data, the audio data is also provided from the voice input buffer 310 to the other communications subsystem, in this example the second communications subsystem 316. In this example the second communications subsystem 316 comprises a Bluetooth audio transceiver. The transceiver may transmit the audio data to a suitable receiving device, such as a mobile phone (in the case where the user interface device 10 is paired with the mobile phone and is operating as a speakerphone microphone for a call placed using the mobile phone). The receiving device may be another user interface device 10, such as another smart speaker, or another Bluetooth enabled speaker.

Thus, the audio data from the audio input subsystem 302 is provided to the internal buffer 310 via a first audio data input path. From the internal buffer 310, the audio data is transmitted on a first audio data output path from the internal buffer 310 to the first communications subsystem 312, and on a second audio data output path from the internal buffer 310 to the second communications subsystem 316.

Audio information may be incoming from a different source. For example, in the case where the user interface device 10 is paired via the Bluetooth connection with a smart speaker or a mobile phone, audio data may be received at the second communications subsystem 316. This audio data is provided on a second audio data input path to the voice output buffer 314, and thence on a third audio data output path from the output buffer 314 to a codec component 318 and an audio output system 320. The audio output system 320 may comprise the speaker assembly of the user interface device 10, or a line out to headphones or another listening device. Again, it should be noted that not every component or signal (e.g., clock signals and the like) is illustrated in the accompanying figures for the sake of simplicity.

As can be seen in FIGS. 3 and 4, a switch SW1 is interposed between the audio input subsystem 302 and the input buffer 310; a switch SW2 is also interposed between the input buffer 310 and the second communications subsystem 316, and between the second communications subsystem 316 and the output buffer 314. The transmission of audio data described in FIG. 3 reflects the available audio data paths when the switches SW1, SW2 are in a first state.

However, when the switches SW1, SW2 are in a second state as shown in FIG. 4, the available audio paths are altered. Instead, audio data obtained at the audio input subsystem 302 follows a first audio data bypass path from the audio input subsystem 302, between the first and second switches SW1, SW2, to the second communications subsystem 316. The first audio data input path is thereby terminated, and the audio data bypasses the input buffer 310. Since the audio data is not received in the input buffer 310, it is not available to be transmitted via the first communications subsystem 312 to the intelligent automated assistant service. Moreover, since the input buffer 310 does not receive the audio data, it is not even temporarily stored in the input buffer 310.

Similarly, audio data received via the second communications subsystem 316 follows a second audio data bypass path from the second communications subsystem 316 to the audio output subsystem 320. In this way, the received audio data bypasses the output buffer 314.

It will be appreciated by those skilled in the art that following this configuration, when the switches SW1 and SW2 are switched from their first to their second state, audio data obtained at the audio input subsystem 302 may continue to be routed to the second communications subsystem 316. For example, consider the case where a voice call had been established by a mobile phone (not shown) paired via Bluetooth with the user interface device 10, and the call was underway while the switches SW1, SW2 were in the first state. The user may be using the user interface device 10 as a speakerphone accessory for the mobile phone; thus, the user, speaking to the called party, speaks into the user interface device 10 and the audio input is received by the audio input subsystem 302. The audio data from the audio input subsystem 302 is routed via the first audio data input path to the input buffer 310, and to the second communications subsystem 316 via the second audio data output path. At the same time, the user interface device 10 may continue to monitor the audio input for a wake word. On detection of the wake word, the microprocessor 306 begins transmitting the audio data received at the input buffer 310 to the intelligent automated assistant service via the second communications subsystem 312. It should be appreciated that the use of Bluetooth and W-Fi in this description are for example only; other protocols, or even the same protocols, may be employed by the first and second communications subsystems 312, 316. If, however, the switches SW1, SW2 are placed in the second state, no further audio data is received by the input buffer 310, and consequently no further audio data is sent to the intelligent automated assistant service. However, the audio data continues to be routed to the second communications subsystem 316, so the user's call can continue.

While the switches SW1, SW2 are illustrated as two separate single-pole, double-throw switches, it will be appreciated from the foregoing that their functionality can be aptly implemented as a mechanical double-pole, double-throw switch. In other embodiments, however, the switch mechanism may be implemented programmatically, in software executing on the user interface device 10. Optionally, when the switches SW1, SW2 are placed in the second state, an audible notification—which may be in addition to a visual notification—is played via the audio output subsystem 320 to indicate that the second state has been enabled. This may be in the form of speech output that "privacy mode has been enabled". Similarly, when the switches SW1, SW2 are returned to the first state, an audible notification, again optionally with a visual notification, is played via the output subsystem 320 to indicate that the first state has been enabled. This may be in the form of speech output stating that "privacy mode has been disabled".

Figure 5:
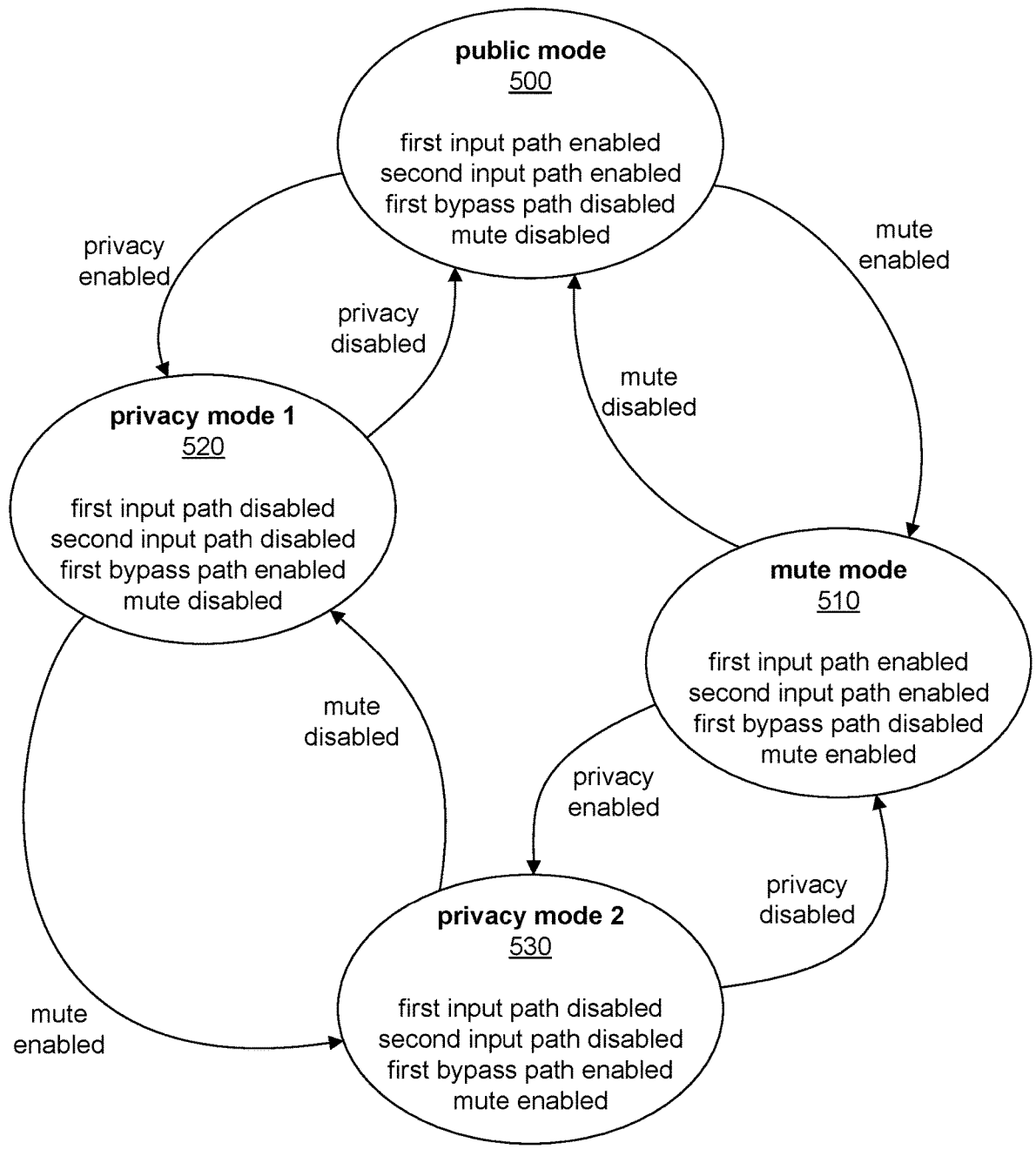
FIG. 5 is a state diagram illustrating transitions of the user interface device between different security states.

The foregoing states are to be contrasted with a general "mute" function that disables the microphones of a user interface device 10. As explained above, a mute function prevents any use of the microphones of the device 10. The distinction can be seen more clearly with reference to FIG. 5, which illustrates the possible states of the user interface device 10. In an initial state 500, neither the mute function nor the "privacy" mode mentioned above has been enabled; the switches SW1, SW2 in the example of FIGS. 3 and 4 are in the first state, and the user interface device is in what may be termed a "public" mode. The first input audio data path and the second input audio data path described above are enabled, while the first bypass path described above is disabled.

From the initial state 500, either the mute mode may be enabled, or the privacy mode may be enabled. In response to activation of the switches SW1, SW2 to place them in the second state, a first privacy mode 520 is enabled. In this state, the first input audio data path and the second input audio data path described above are disabled, while the first bypass path described above is enabled. The mute function is not enabled. Alternatively, from the initial state 500, the mute mode may be enabled. In this state 510, the first input audio data path and the second input audio data path described above are enabled, and the first bypass path described above is disabled, but the mute function is enabled.

From the first privacy mode 520, the state may return to the initiate state 500 if the privacy mode is disabled (e.g., the switches SW1, SW2 are returned to the first state described above) or may transition to a second privacy mode 530 if the mute function is enabled. In the second privacy mode 530, the first input audio data path and the second input audio data path described above are disabled, the first bypass path described above is enabled, but the mute function is enabled. From the second privacy mode 530, the state may return to the first privacy mode 520 if the mute function is disabled, or alternatively the state may return to the mute mode 510 if the privacy mode is disabled. Thus, the user interface device 10 may be placed in a privacy mode, and in addition to the privacy mode, may also be muted such that the audio input system does not pick up and process input sound at all.

FIG. 6 illustrates a further embodiment of a user interface device 10 in which the wake word detection functionality is implemented by the microprocessor 306. As noted with reference to FIGS. 3 and 4, when wake word detection is implemented at the audio input subsystem 302, an interrupt from the audio input subsystem 302 triggers operations by the microprocessor 306 to send audio data to the intelligent automated assistant service. However, if wake word detection is implemented by the microprocessor 306 using audio data received in the input buffer 310, then when the user interface device 10 is in a privacy mode—e.g., the switches SW1, SW2 are in the second state—then no wake word detection is possible.

The foregoing examples illustrate a double switch embodiment which reroutes audio data sent to and received from the second communication subsystem 316. It will be appreciated by those skilled in the art that other circuit configurations are possible to isolate input audio data from the audio input subsystem 302 from the input buffer 310 and/or the first communications subsystem 312. However, the implementation described above has the advantage that the second communications subsystem 316 does not need to be configured to receive audio data from different inputs in dependence on whether the user interface device 10 is in the aforementioned privacy mode or not.

While the example above was directed to a simple user interface device, such as a smart speaker, using Bluetooth and Wi-Fi communication capabilities and a microphone array for user input, those skilled in the art will appreciate that this example simply illustrates the inventive concepts in use with common smart speaker features. The concepts described here need not be limited to particular wired or wireless communication protocols, nor even to a microphone array. For example, the user interface device 10 may also be provided with a camera or other sensors 240, as noted above. The user interface device 10 may also be configured such that enablement of privacy mode also prevents transmission of camera and other sensor data to the first communications subsystem 316 or to the intelligent automated assistant service, while permitting transmission of the data to local devices in the same network as the user interface device 10.

As mentioned above, the switching element in the examples provided above makes use of switches SW1, SW2, which may be implemented as a mechanical switch in the user interface device 10, although a software-implemented mechanism may be used instead. The user interface for the switch mechanism by the user may be implemented by means of a software or hardware switch. For example, a smart speaker 275 may be provided with capacitive buttons 281, 282, 283, as shown in FIG. 7. These buttons may be configured for power on/off, mute on/off, and privacy on/off, respectively. However, it may be desirable to provide users with a distinct tactile experience when implementing the privacy mode as a form of reassurance that a connection with the intelligent automated assistant service has been severed. This may be accomplished by providing a different physical user interface mechanism, such as a slider or rocker switch 285, as shown in FIG. 8.

In other implementations, the privacy mode may be enabled, and optionally disabled, using software methods, for example by employing a relay controlled by signals generated in response to user interaction with the user interface device 10 itself, or with a remote controller or application executing on a separate computing device. For example, the user interface device 10 may be comprised in a smart speaker or smart television that is configured to sense and respond to infrared (or other) signals transmitted from a remote controller. The remote controller may be a dedicated device (i.e., intended to be used only to control the user interface device 10) or may be provided by an appropriately configured computing device, such as a smartphone, personal computer, tablet computer, and the like. In the case of a dedicated remote controller device, the user may actuate a "privacy mode" button to generate a signal received by the user interface device 10, which in turn triggers a signal to the relay to switch the data paths as described above to enable the privacy mode. Another actuation of the button on the dedicated remote controller device may be used to trigger a further signal to switch the data paths from the bypass paths, and thereby disable the privacy mode.

If a computing device is used, remote control functionality may be provided by a special-purpose application executing on the computing device, or a webpage or plug-in in a general-purpose browser client executing on the computing device. Actuation of user interface elements provided by the application or browser (e.g., buttons displayed on a touchscreen device) may be used to enable and disable the privacy mode. While the computing device may operate like the dedicated remote controller device, and transmit a signal directly received by the user interface device 10 that in turn triggers the enabling/disabling of the privacy mode, the computing device may instead transmit, over a wired or wireless network connection, a signal to the intelligent automated assistant service that the privacy mode is to be enabled or disabled; the intelligent automated assistant service, in turn then transmits an instruction to the user interface device 10 accordingly. These examples permit control of the user interface device 10 without the use of a spoken command or speech recognition. In other implementations, contextual information obtained by the sensor inputs 240 may be used to trigger enablement of the privacy mode. For example, a user interface device 10 may be configured to enable privacy mode when an ambient light sensor detects a specified change in the lighting level in the room in which it is located.

For enhanced privacy protection, to reduce the possibility of undesired disabling of the privacy mode, the user interface device 10 may be configured so that disabling the privacy mode after it is enabled using a software-mediated or remote controller means (e.g., using voice control, a remote controller, or application) can only be accomplished by a physical input on the device (e.g., actuating the mechanical switch described above), or by input of a password or other authorization code if a computing device is used to disable the privacy mode. In addition, or alternatively, when the privacy mode is enabled using a computing device, the user may be required to provide credentials to authorize the privacy mode.

As another example, voice command may be used to enable the privacy mode on the user interface device 10. In one implementation, a spoken command to enable privacy mode is received by the audio input subsystem 302 and routed to the intelligent automated assistant service for speech recognition and processing, as is typically done when the user interface device 10 is not in privacy mode. In response, the intelligent automated assistant service sends an instruction to the user interface device 10 to enable the privacy mode, after which point no further voice input detected by the audio input subsystem 302 will reach the intelligent automated assistant service. Thus, a spoken command cannot be used to disable the privacy mode; instead, a signal to disable the privacy mode must be initiated using a different software-mediated or remote controller means such as those described above.

Alternatively, the user interface device 10 itself may be configured to recognize at least the spoken command to disable the privacy mode, in a similar manner to being configured to locally recognize a wake word without depending on the intelligent automated assistant service, as described above. Of course, the user interface device 10 could also be configured to recognize the spoken command to enable privacy mode in a similar manner. These various means of enabling and disabling privacy mode can be combined as appropriate.

The examples and embodiments are presented only by way of example and are not meant to limit the scope of the subject matter described herein. Variations of these examples and embodiments will be apparent to those in the art and are considered to be within the scope of the subject matter described herein. For example, some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A user interface device, comprising:
    an audio input subsystem;
    a first and a second communications subsystem;
    at least one processor in operative communication with the audio input subsystem and the first and second communications subsystems;
    a first audio data input path between the audio input subsystem and an internal buffer;
    a first audio data output path between the internal buffer and the first communications subsystem;
    a second audio data output path between the internal buffer and the second communications subsystem;
    a first audio data bypass path between the audio input subsystem and the second communications subsystem;
    a switch element, when in a first state, directing audio data provided by the audio input subsystem on the first audio data input path to the internal buffer, and to both the first communications subsystem and the second communications subsystem on the first audio data output path and the second audio data output path, respectively;
    the switch element, when in a second state, terminating the first audio data input path and directing the audio data provided by the audio input subsystem to the second communications subsystem on the first audio data bypass path.

2. The user interface device of claim 1, the switch component in the second state also terminating the second audio data output path.

3. The user interface device of claim 1, wherein the switch element comprises a first switch that switches audio data received from the audio input subsystem between the internal buffer and a second switch, and the second switch that directs audio data from either the internal buffer or the first switch to the second communications subsystem.

4. The user interface device of claim 1, wherein the first switch and the second switch comprise a double-pole, double-throw switch.

5. The user interface device of claim 1, wherein the switch component comprises a user-operable mechanical switch on an exterior of the user interface device.

6. The user interface device of claim 1, further comprising:
    a second audio data input path between the second communications subsystem and the internal buffer;
    a third audio data output path between the input buffer and an audio output subsystem; and
    a second audio data bypass path between the second communications subsystem and the audio output subsystem,
    the switch element in the first state directing audio data obtained by the second communications subsystem on the second audio data input path to the internal buffer, and to the audio output subsystem on the third audio data output path,
    the switch element in the second state terminating the second audio data input path and directing the audio data obtained by the second communications subsystem to the audio output subsystem on the second audio data bypass path.

7. The user interface device of claim 1, wherein the user interface device comprises a smart speaker.

8. The user interface device of claim 7, further comprising a mute control subsystem configured to disable receipt of audio input by the audio input system.

9. The user interface device of claim 7, wherein the audio data comprises speech data, and the first communications subsystem is configured to transmit the speech data to a speech recognition system.

10. The user interface device of claim 1, wherein the second communications subsystem is a Bluetooth communications subsystem, and the first communications subsystem is a wireless communications subsystem other than a Bluetooth communications subsystem.

11. A method, implemented at a user interface device comprising an audio input subsystem, at least a first and second communications subsystem, and a user input interface, the method comprising:
    obtaining audio data from audio input received at the audio input subsystem;
    directing the audio data simultaneously to the first communications subsystem for transmission to a first external system and to the second communications subsystem for transmission to a second external system;
    receiving a first user input at the user input interface; and
    in response to receipt of the first user input, terminating direction of the audio data to the first communications subsystem and directing the audio data only to the second communications subsystem,
    wherein the user input interface comprises a switch for receiving the first user input, the switch controlling audio data paths between the audio input subsystem, the first communications subsystem, and the second communications subsystem, and further wherein terminating direction of the audio data to the first communications subsystem and directing the audio data only to the second communications subsystem comprises the switch switching the audio data path from a first path to a second path, wherein the first path directs audio data from the audio input subsystem to both the first and the second communications subsystems and the second path directs audio data from the audio input subsystem to only the second communications subsystem.

12. The method of claim 11, further comprising:
    receiving a second user input at the user input interface; and
    in response to receipt of the second user input, disabling receipt of audio input at the audio input subsystem.

13. The method of claim 11, wherein the audio data comprises speech data.

14. The method of claim 11, wherein the first external system is untrusted, and the second external system is not untrusted.

15. The method of claim 14, wherein the audio data is transmitted to the first external system over a public network and the first external system comprises a speech recognition system.

16. The method of claim 15, wherein the second communications subsystem comprises a wireless transceiver and the second external system comprises a mobile telephone.

17. The method of claim 16, further comprising:
before receiving the first user input:
establishing a voice call over a wireless network using the mobile telephone, wherein during the voice call speech input is received at the audio input subsystem wherein the audio data directed to both the first communications subsystem and the second communications subsystem comprises speech data obtained from the speech input; and
receiving, via the first communications subsystem from the first external system, a response to the speech data;
and wherein the voice call is continued when direction of the audio data to the first communications subsystem is terminated.

18. The method of claim 11, wherein:
directing the audio data simultaneously to the first communications subsystem for transmission to the first external system and to the second communications subsystem for transmission to the second external system comprises storing the audio data in an internal buffer and sending the stored audio data to the first communications subsystem and the second communications subsystem; and
when direction of the audio data to the first communications subsystem is terminated, the audio data is directed to the second communications subsystem without storing the audio data in the internal buffer.

19. The method of claim 18, further comprising:
receiving, by the second communications subsystem, further audio data;
prior to receipt of the first user input, directing the further audio data an audio output subsystem of the user interface device by storing the further audio data in the internal buffer, then sending the stored further audio data to the audio output subsystem; and
in response to receipt of the first user input, directing the further audio data from the second communications subsystem to the audio output subsystem without storing the further audio data in the internal buffer.

* * * * *